//  Patented Nov. 25, 1952

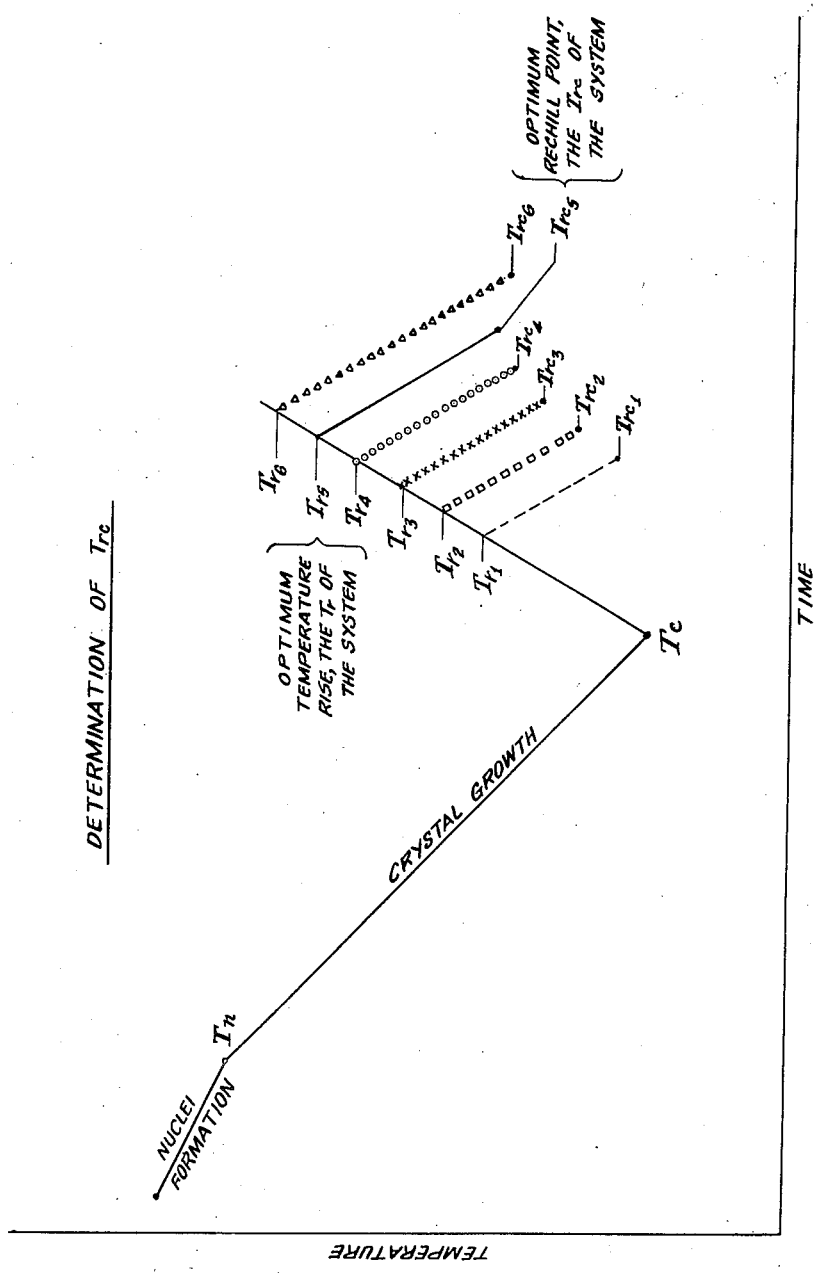

UNITED STATES PATENT OFFICE 2,619,421

METHOD OF SEPARATING THE COMPONENTS OF A MIXTURE OF FATS AND OILS

Charles Greenfield, River Edge, N. J.

Application November 22, 1950, Serial No. 197,090

12 Claims. (Cl. 99—118)

This invention relates to the physical separation of the components of vegetable and animal oils and related materials; and in particular is directed to improvements in the "winterizing" of vegetable and animal oils, the fractionation of animal and vegetable stearines, and the separation and fractionation of mixed fatty acids, and derivatives of oils and fats such as fatty amines, fatty nitriles, fatty acid esters, and sterols, phospholipids and waxes.

The prime purpose of "wintering" is to produce oils that will remain clear at lower temperatures than those at which the unprocessed oils ordinarily would remain clear. Usually, specifications in the industry require that a 4 ounce sample of a "winterized" oil remain clear for a minimum of 5½ hours when immersed in a mixture of cracked ice and water (32° F.).

The "winterizing" is presently accomplished by the following means:

1. Tanks of oil are stored outside in the winter weather while crystallization gradually takes place, and the "heavy fat" crystals drop to the bottom. The clear supernatant oil, known as the "wintered oil" as distinguished from "summer oil," is tapped off at some elevated point in the tank. This method allows for a partial separation of the higher melting constituents (stearine) from the lower melting constituents (the wintered oil).

2. Tanks of oil are chilled by cold brine flowing through coils placed inside the tanks, or the oil is chilled in tanks that are placed in an insulated cold room. The oil is chilled until crystallization is considered complete, and the oil is then pumped or fed by gravity or air pressure to plate and frame filter presses. Varying degrees of controlled cooling are exercised. In the best practice, crystals are formed by cooling slowly from elevated temperature to a lower temperature. Sometimes the material is held for a while at a fixed temperature (usually indicated by the evolution of heat of crystallization and creation of a slight rise in temperature) in order to complete crystallization, and cooling is then continued to a point which is a few degrees below the temperature at which the rise occurred. The fats are then filtered to effectuate a separation of the desired constituents, the stearine and the wintered oil.

In the oleo oil and lard oil industry the following method is used in processing oleo oil (edible beef fat) to produce low melting oleo oil and high melting oleostearine. The fat is melted and run into small portable tanks where it is reduced to a grainy, pasty mass by holding for several days at about 95° F. The partially solidified mass is scooped from tanks, in portions of a few pounds each, and these are wrapped in cloths and subjected to moderate pressures in a hydraulic press to yield liquid oleo oil and a press cake of oleostearine.

In the production of "wintered" fish oils, the fats are generally chilled in a tank or tanks, placed in a cold insulated room and cooled, and passed through a plate and frame filter press. Often the fat is passed through continuous crystallizers. These have scraper conveyers which turn very slowly in horizontal cylinders. Such scrapers remove the solidified fats at the wall of the cylinder and allow heat transfer from the outer jacket which contains the cooling medium. The fats are filtered, as above described, to effectuate the separation of the stearine from the "wintered" oil.

In practice it has been found that the yields of "winterized" oils are generally considerably lower than the analysis of the unwintered material would indicate, such loss in yield being due principally to the fact that the stearine removed from the oil contains a substantial amount of the low melting oil. Bailey reports that whereas 8% to 12% of the unwintered cottonseed oil only need be removed to meet the cold test requirements, in actual practice, from 20% to 30% of the oil is lost as cottonseed oil stearine. ("Melting and Solidification of Fats," by Alton E. Bailey, Interscience Publishers, New York, N. Y., publihed 1950, page 343.)

In the case of cod liver oil, from 15% to 30% is lost as stearine in the industrial winterizing, whereas the removal of from 3% to 6% of the stearine would produce an oil that meets the U. S. P. cold test requirements for a destearinated cod liver oil.

The cooling of oils by the known processes has resulted in excessive occlusion of the winterized oils in the stearines removed therefrom. Furthermore, such occlusion has resulted from the production of poorly formed crystals which thicken the oil considerably, often in gel form, and make the filtration a very slow process, and indeed, often impossible for commercial purposes. Repeated crystallizations by fractional crystallization techniques are very difficult to carry out because the melting point range, after the first separation is made, is narrower, and the control even more difficult to achieve than before the first crystallization.

In efforts to minimize the loss of the oil entrained in the stearine, the stearine is further cold pressed by wrapping it in cloth and subjecting it to hydraulic pressure. Although additional yields of "winterized" oils are obtained by such means, these operations require substantial manual labor. However, even such processing is difficult of accomplishment because the crystals in the stearine make the pressing a difficult operation, and even thereafter there still remains a large content of "winterized" oil in the pressed stearine.

The most important commercial fractional crystallization process applied to fatty acids is that used in the manufacture of so-called stearic and oleic acid (red oil) from inedible tallow.

In such processes the molten tallow fatty acids are run into small aluminum pans. The filled pans are cooled in a cold room to an ultimate temperature of 40° F. to 45° F., about 12 to 20 hours being allowed for the operation. Then the solidified acids are removed from the pans in the form of cakes which are pressed in hydraulic presses under pressures of from 150 to 250 pounds per square inch (p. s. i.). The expressed liquid is commercial oleic acid and has a titer (solidifying point) of approximately 10° C. This product is further chilled and filtered to produce an oil having a titer of 0° to 5° C. The cakes from the cold pressing operation are melted, recast at room temperature, and pressed one or more times in steam-heated hot presses. A single hot pressing yields so-called "single pressed" stearic acid; two pressings yield "double pressed" grade of stearic acid; and three pressings a "triple pressed" or highest grade of stearic acid which has an iodine value of 3–4, and a titer of 130.5° F. to 131.5° F. The liquid material from each pressing, as well as the soft edges of the cake, are recycled to the original feedstock. It is reported that the recycled acids may amount to as much as 40% of the material being processed. The natural ratio of palmitic and stearic acids in inedible tallow is within the range of good crystalline properties of this system. In the case of fats in which the proportions of the palmitic and stearic acids are different from that above mentioned, the processing results in small and poorly formed crystals that are difficult, and sometimes impossible, to manipulate in the manner described.

The technical literature contains much discussion on these important problems. It is the belief of some workers in this art that the major difficulty encountered in the removal of the component fats from the mother fat solution was that of proper crystal formation. It is known that fats are readily super-cooled, a phenomenon whereby component fats remain in solution, although the temperature is appreciably below the solidification point of a component fat or component fats. The exact nature of this super-cooling is not fully understood, although many theories have been presented during the last half century to explain the phenomenon. It is generally believed that long periods of time are necessary for fats to crystallize and reach "equilibrium" conditions. It has been known that if the crystal nuclei are properly formed, the subsequent crystal growth as the temperature is lowered is more readily achieved. Conditions of crystallization that are helpful for proper nuclei formation are purity of solution, prior removal of amorphous constituents such as nitrogenous contaminations, dissolved and entrained water, and the addition of crystal formation promoters, as for example, seeding.

I have found that it is possible markedly to improve the separation of the low melting components of oils so as drastically to reduce the loss of oil in carrying out winterizing operations. I have also found that I can markedly improve the fractionation of oils, fatty acids, and their aforesaid derivatives by means of techniques hereinafter to be described.

Accordingly, it is among the principal objects of this invention to provide a novel process for the winterization of oils whereby the loss of the winterized oil is drastically reduced.

Another object of this invention is the provision of a novel process for the fractionation of fatty oils, fatty acids, fatty acid esters, fatty acid derivatives, such as fatty acid amides, and fatty acid nitriles, whereby sharp separation of the components may be achieved in a relatively simple manner.

Additional objects and advantages will become apparent from the more detailed description of the invention as it is hereinafter set forth.

In its principal aspects the primary objects of this invention are achieved by careful control of nuclei formation, and crystal growth, followed by "stabilization" of the crystals formed so that such crystals may readily be separated from the body of the oil.

I have found that in an oil or fatty material composed of a plurality of components of various melting points, crystal nuclei may be formed by slowly cooling from a starting temperature which is not more than 15° F. higher than the temperature at which the nuclei are normally regarded to be formed. This point is designated as "nuclei control point" ($T_n$). The nuclei control point is ascertained by relatively simple tests. The first or preliminary test is made on a 4 ounce sample of oil in order to determine the cloud point as described under "Testing the Petroleum Products" p. 683 of "Commercial Methods of Analysis" by Foster D. Snell and Frank M. Biffen, published by McGraw-Hill, New York, N. Y. (1944). This cloud point fixes the temperature range for the accurate determination of the nuclei control point. The second or controlling test requires that a 1 liter sample of the oil be placed in a beaker and warmed to dissolve any crystals that may be present. The sample is then cooled fairly rapidly by means of a cooling bath until the temperature of the oil is approximately 25° F. above the cloud point found in the first test. The temperature is then lowered at a uniform rate of 1° F. per hour until a distinct cloud (or haze) or visible nuclei are evident. This temperature is regarded as the nuclei control point ($T_n$), and governs the starting operation in this process.

Starting therefore at a temperature of not more than $T_n$ plus 15° F., the fatty material is cooled at a fairly uniform rate for a period of from 18 to 48 hours until $T_n$ is reached. For example, if the fatty material has a $T_n$ of 50° F., the controlled cooling is started at a temperature of not more than 65° F., and continued at a fairly uniform rate for a period of between 18 to 48 hours until the temperature reaches 50° F. In this way, definite nuclei formation is obtained which is usually visible by the presence of distinct particles.

After this nuclei formation is achieved, the temperature of the fatty material is gradually lowered at a fairly uniform rate of 5° to 15° F. per 24 hours to a temperature designated as the crystallization point ($T_c$), and the fatty material is then subjected to a temperature rise by a relatively faster heating rate of 15° to 45° F. per 24 hours until it reaches a temperature designated as the "temperature rise point" ($T_r$), a point that lies somewhere between $T_c$ and $T_n$, and thereby "stabilized" crystals are achieved. I use the term "stabilize" to identify the crystalline fats thus formed, which are relatively hard, easily filterable, distinctly observable under microscopic examination, and are particularly characterized by the fact that they occlude but a minimum of mother fat. In contrast to stabilized crystals, unstabilized crystals are relatively soft at the temperature of filtration, are not distinctly observable under microscopic examination, and occlude large quantities of mother fat.

After the stabilization is achieved, the temperature of the fatty material may be slowly reduced at the rate of 5° to 15° F. per 24 hours until an ultimate temperature is reached which lies between $T_c$ and $T_r$ and is designated as the "rechill point" ($T_{rc}$). The material is then filtered to remove the crystallized component of the fat and obtain the liquid fraction thereof.

DETERMINATION OF THE CRYSTALLIZATION POINT ($T_c$)

As a batch of oil is gradually cooled from the nuclei control point ($T_n$) samples are taken at successively descending temperatures and are filtered in each case resulting in a solid and liquid fraction. When a filtrate meets the desired cold test specifications for a wintered oil, or a chemical analysis of the solid fraction indicates that the desired components have been satisfactorily crystallized out of the mother fat, the temperature $T_c$ at which this sample is taken is regarded as the crystallization point in the process. The actual $T_c$ used in the process may be a degree or so lower to insure the complete crystallization of the desired components.

DETERMINATION OF THE TEMPERATURE RISE POINT ($T_r$) AND THE RECHILL POINT ($T_{rc}$)

In order to achieve maximum efficiency for the crystallization process, the optimum $T_r$ and optimum $T_{rc}$ must be ascertained. These two temperature points are interrelated as shown below by the recommended test procedure, as shown in the accompanying drawing.

A batch of oil is made to develop nuclei and crystal growth according to the procedure previously outlined, until $T_c$ is reached. The oil is then raised in temperature a few degrees to a temperature designated as $T_{r_1}$. The oil is then rechilled at the original cooling rate, and samples are withdrawn at successively descending temperatures. Each sample is filtered at the temperature of sampling to provide a solid and liquid fraction. When a sample so tested, produces a filtrate meeting the desired cold test specifications of a wintered oil, or a chemical analysis of the solid fraction indicates that the desired components have been crystallized to the desired degree, the temperature at which that sample was drawn is designated as the rechill point $T_{rc_1}$ for this particular cycle, and is correlated with the temperature $T_{r_1}$. $T_{rc_1}$ has a higher value than $T_c$. Another sample of the oil is then raised from $T_c$ to a temperature $T_{r_2}$ which is slightly higher than $T_{r_1}$. The oil is then rechilled and samples are withdrawn during the rechilling cycle until one sample yields a filtrate and solid fraction which meets the desired requirements as above. This rechill point is designated as $T_{rc_2}$ and has a higher value than $T_{rc_1}$.

The procedure as described for the two complete crystallization cycles is continued producing successively ascending values of $T_r$ and $T_{rc}$ until a value of $T_{rc}$ is obtained which is lower than the value obtained in the immediately preceding test cycle. The temperatures $T_r$ and $T_{rc}$ of the immediately preceding test cycle are then regarded to be the optimum temperatures to be used in the winterizing process or fractionation process.

The art has generally assumed that the optimum crystalline condition for filtration lies in the formation of relatively large crystals. While this is true as to filtration rate, large crystals, however, occlude considerable mother fat and require lengthened periods for their growth. I have found that relatively small crystals filter very well and are more suitable for the separation of component fats, provided that they are in the "stabilized" form. I, therefore, prefer crystal sizes of approximately .01 to .1 inch. The crystals small and "stabilized" form a solid compact cake when filtered. This solid cake is easier to press than those previously worked in this art, and excellent separation of mother fat from a component fraction may be made.

Since purity of solution is an essential feature of the crystallization process, I have found that a preliminary dehydration, if necessary, and clarification (by filtration) is of great aid in carrying out this process. I prefer to use vacuum dehydration instead of settling or centrifugation, as water is removed by the latter methods only at the temperature of separation. I have found that any dissolved or entrained water interferes with crystal formation. After removal of the water, the oil may be readily freed of solids such as proteins and mucilagenous materials by mixing filter aid with the dehydrated oil and this mixture filtered. I have found that diatomaceous earths, such as Hyflow and Celite #535, are very efficacious for such purpose. If high purity is desired, Filtercel may be used although filtration rates may be considerably lower. A decolorizing treatment will accomplish additional purity.

In carrying out the process of this invention, the purified oil is pumped into tanks in an insulated room. The air in the room is cooled by suitable evaporator blowers, the cooling system being actuated by Freon or other suitable refrigerants. The temperature is controlled within plus or minus 1° F. if necessary by an automatic time-temperature controller and recorder, whose cycle of temperature, which may be for as long as a week or more, is predetermined by the operator cutting out a cam of sheet metal. The cold air sweeping past the tanks removes heat from the oil at a comparatively slow rate and thus the temperature of the oil is controllable to within a small fraction of a degree. The temperature cycle includes the various cooling and heating operations above described. Heaters are used, and may be of the electric or steam type. The average oil used for wintering operations requires three days for its temperature processing. The temperature of the oil is 5° to 15° F. higher than its $T_n$ when it is pumped into the tanks positioned in the processing room. When the oil-temperature-time-cycle $T_c$, $T_r$, $T_{rc}$ is complete the oil is discharged into tanks in the filtration room which is kept at a temperature equal to that of the final temperature ($T_{rc}$) in the cooling room. The discharge is preferably made by gravity. Compressed air may be used but pumping or any manner which will break up crystals is to be avoided. If the filtration apparatus is not ready to receive the batch of oil with the suspended crystals when $T_{rc}$ is reached, then the temperature of the batch is raised a few degrees (at a rate of 15° to 45° F. per 24 hours), and recooled (at a rate of 5° to 15° F. per 24 hours) to $T_{rc}$ and then filtered. If, after such cycle, the filtration apparatus is still unavailable, the cycle is repeated, and rerepeated if necessary, until the filtration equipment is available. I have found that these additional temperature cycle changes are important, because, if the oil is allowed to set at a fixed temperature, especially near the end of the crystallization process, there is a higher loss of mother fat which is occluded or entrained by the stearine, as well as a lowering of the filtration rate. I do not know whether the losses arising from allowing the oil to remain at a fixed temperature as contrasted with my oscillation of temperature described above, is due to a change in crystal forms which occludes more oil, but it is important in any case to keep this process under continuous temperature change either by lowering or increasing temperatures.

It is important to note that the delicate control of cooling, heat transfer, and automatic operations enhance the crystallization process considerably.

If crystallization is improper, a reheating step may dissolve all of the crystals and therefore no advantage would be obtained by this step. All important factors in the art of crystallization should be followed to effect the best results.

Although I have found air cooling to be most expedient, and this air is usually contained in an insulated room cooling may be effected as well by circulating temperature controlled air through jackets that surround the containers described, as for example, cold, warm or hot air, depending on the particular cycle of the processing operation. Liquid cooling mediums such as hot or cold water, brines, or circulating refrigerants may be used but since heat transfer conditions are an improvement over air circulating methods, it is important that the temperature differential between the liquid medium and the oil be lowered so as not to effect too rapid cooling.

The filter press itself may be of jacketed design in order to maintain the oil temperature. This is especially true if the temperature is too high for convenient operation in an insulated room. I have found vacuum installation of filter press to be preferable to all other filtering methods. I have found that as a result of the natural circulation induced by the cooling operations described, there are formed crystals that are very satisfactory without any additional agitation from external sources. However, if any stirring or mixing is to be incorporated in this process, I prefer it to take place after stabilization has been effected. A slight stirring will often aid the action of the reheating process. I have found that stirring (beyond natural convection currents formed in the oil) is detrimental during the formation of nuclei and in the slow cooling process where the further growth of crystals takes place.

Illustrative examples describing embodiments of this invention are as follows:

*Example 1*

100 gallons of cod liver oil, after having been processed by vacuum dehydration and filtration (for purification purposes) and having a nuclei control point ($T_n$) of 52° F. is pumped into a steel tank positioned in an insulated room. Cold air circulating in the room is temperature controlled by a time temperature controller (and recorder) which actuates a Freon compressor unit controlling evaporator blowers in the room; the same unit actuates electric blower heaters when these are required for the reheating steps. The temperature of the oil is slowly cooled from 65° F. to 52° F. (its $T_n$) in approximately a 24 hour period. At this temperature distinct crystal nuclei are evident. The oil is then further cooled at a rate of 10° F. per 24 hours until the temperature of the oil reaches 37° F. ($T_c$). The oil is then reheated to 43° F. (its $T_r$) within a period of 6 hours. The oil is again chilled at the uniform rate of 10° F. per 24 hours until the temperature of the oil reaches 40° F. (its $T_{rc}$). The oil is then gravity discharged to a batch vacuum type plate filter press located in an air-cooled room maintained at the filtration temperature of 40° F. ($T_{rc}$). Paper is used as the filter medium. Cold air is passed through the cake by applying vacuum. The filtrate is a refined destearinated cod liver oil obtained in a yield of 89% (this oil subjected to a cold test is clear for 8 hours) and the stearine is equal to 11%. The stearine is compact and firm at the temperature of filtration, and this stearine is easily removed from the filter press. The stearine, when remelted, has a nuclei control point of 82° F., and is designated as stearine fraction #1.

100 gallons of this stearine fraction #1 having a $T_n$ of 82° F. is pumped into the above described cooling tank set in the cooling room, and it is slowly cooled from 90° F. to 82° F. ($T_n$) in 24 hours to form the crystal nuclei; then further cooled to its $T_c$ of 55° F. at a rate of 8° F. per 24 hours; reheated in 6 hours to its $T_r$ of 65° F.; and finally rechilled at the previous rate of 8° F. per 24 hours until it reaches its $T_{rc}$ of 60° F. The oil is then discharged into the filtration room maintained at 60° F. and filtered, producing a wax fraction having a $T_n$ of approximately 100° F., and an oil fraction #1 whose $T_n$ is 58° F. The yields from stearine #1 are: wax fraction . . . 18%, and oil fraction #1 . . . 82%.

Oil fraction #1 is processed by the technique described above as follows: starting at 65° F. it is cooled to 58° F. (its $T_n$) in 24 hours; then further cooled at a rate of 10° F. per 24 hours until it reaches its $T_c$ of 40° F.; then reheated to its $T_r$ of 47° F. in approximately 6 hours; and finally rechilled to its $T_{rc}$ of 43° F. It is then filtered, as described above, to produce 20% of a stearine fraction #2 having a $T_n$ of 75° F., and 80% of an oil fraction #2 having a $T_n$ of 41° F.

Oil fraction #2 is processed in a similar manner to that of the above fractions by cooling from 48° F. in 24 hours to 41° F. (its $T_n$), and it is then cooled at a rate of 10° F. per 24 hours until it reaches 31° F. (its $T_c$). The oil is then heated during a period of 3 hours to 34° F. (its $T_r$), following which it is rechilled to 32° F. (its $T_{rc}$), and then passed through the filtering operations. In this way there is obtained a stearine fraction #3 (having a $T_n$ of 68° F.) in a yield of 20%, and an oil fraction #3 (having a $T_n$ of 31° F.) in a yield of 80%. Oil fraction #3 passes the cold test for medicinal grade destearinated cod liver oil.

Stearine fractions #2 and #3 are recombined and melted to form a molten stearine having a nuclei control point ($T_n$) of 73° F. This mixed stearine is pumped into the cooling tank described above, and cooled from 82° F. to 73° F. in 24 hours until a temperature of 59° F. (the $T_c$ thereof) is reached. The temperature thereof is then raised to 63° F. (its $T_r$) in 4 hours, after which it is slowly cooled at a rate of 10° F. per 24 hours until the temperature of 60° F. (its $T_{rc}$) is reached.

The material is then filtered whereby a semi-wax fraction #2 is obtained in a yield of 22% and an oil fraction #4 is obtained as a filtrate in a yield of 78%. Oil fraction #4 has a nuclei control point of 59° F.

The total fractionation of the cod liver oil as above described produces the following:

|  | Per cent |
|---|---|
| Destearinated cod liver oil | 89 |
| Oil fraction #3 | 5.75 |
| Total recovery of medicinal grade of cod liver oil | 94.75 |
| Wax #1 | 2 |
| Semiwax | 0.7 |
| Oil fraction #4 | 2.5 |
| Total of fractions removed | 5.20 |

In sharp contrast with the above described separation, ordinary commercial wintering of the same grade of cod liver oil yields 75% of a destearinated cod liver oil having the same cold test as the 94.75% of oil recovered by this process.

Example 2

5 gallons of a 13° C. titer red oil (having a $T_n$ of 54° F.) is placed in a 5 gallon container. Nuclei formation is controlled by slowly cooling the red oil from 65° F. to 54° F. (its $T_n$) in 24 hours. The temperature is then lowered so that the cooling proceeds at the rate of 10° F. per 24 hours until a temperature of 32° F. (its $T_c$) is reached. The temperature of the oil is then raised to 45° F. (its $T_r$), after which it is slowly lowered at the rate of 10° F. per 24 hours until it reaches 40° F. (its $T_{rc}$). The material is then filtered at 40° F. by means of a vacuum filter. The filtrate is a minus 1° C. titer red oil (yield . . . 83%) and the filter cake is a 27° C. titer stearine (yield . . . 17%).

By conventional chilling of the above red oil to approximately 40° F., and filtration at that temperature, the red oil filtrate therefrom is a 4° C. titer (obtained in a yield of 60%) and the stearine amounts to 40%.

Example 3

A fractionation of the methyl esters of castor oil fatty acids was carried out by the above described procedure. The esters having a $T_n$ of 55° F. were cooled from 65° F. to 55° F. during a period of 24 hours, after which the cooling was continued at a rate of 10° F. per 24 hours until the temperature reached 0° F. (its $T_c$). The oil was then reheated in approximately 8 hours to 10° F. (its $T_r$), following which it was cooled at a rate of 10° F. per 24 hours until it reached 6° F. (its $T_{rc}$) when it was filtered. The fractions obtained analyzed as follows:

|  | Stearine | 6° F. Filtration |
|---|---|---|
| Refractive Index | 1.4630 | 1.4618 |
| Sap. value | 175.1 | 179.4 |
| Acetyl Sapon. value | 330.0 | 312.6 |
| Acetyl value | 178.1 | 154.0 |
| Iodine value | 80.7 | 86.1 |

Example 4

A mass of butter was melted and the upper clear layer separated from the curd. The butter was dehydrated by the vacuum method and mixed with the filter aid (Celite #535) and filtered. The filtrate, a butter fat having a $T_n$ of 82° F. was slowly cooled at a rate of 15° F. per 24 hours from 90° F. to 82° F. (its $T_n$), after which the temperature was slowly reduced to 72° F. (its $T_c$). The fat was then reheated to 75° F. (its $T_r$), and then cooled to 73° F. (its $T_{rc}$). The material was then filtered by vacuum technique. There was obtained a high melting fraction (melting point above 100° F.) in a yield of 40%; and an oil fraction having a melting point of 60° F. in a yield of 60%. On reprocessing the above oil fraction by the above described procedure there was obtained a very flavorsome butter oil that remained liquid and clear at 50° F.

Example 5

5 gallons of milo oil containing phospholipids, gums, and waxes is chilled from 60° F. At this temperature some nuclei are evident. The cooling is conducted at a rate of an 8° F. drop per 24 hours until a temperature of 30° F. is reached. The oil is then reheated to 40° F. in approximately 6 hours, and then rechilled at a rate of 8° per 24 hours until a temperature of 35° F. is reached. The oil is vacuum filtered at 35° F., and a residue of brown gummy material (yield of 2%) is removed by the filtration.

I have also processed, by the above described technique, sperm body and sperm head oils, neat's-foot oil, herring oil, and obtained winterized oils therefrom in high percentages.

The separation of the components of the materials above mentioned may also be carried out by applying the above described technique to solutions of the material in the customary solvents therefor, e. g., alcohols, ketones, hydrocarbons, etc., except that the quantity of the solvents employed in this technique are drastically less than those now being used in methods employing solvents, e. g., the Emersol process, and the like. The $T_n$, $T_c$, $T_r$, and $T_{rc}$ of such solutions are determined in the same way as above described.

It will be understood that the foregoing description of the invention and the examples set forth are merely illustrative of its principles; and accordingly that the appended claims are to be construed as defining the invention within the full spirit and scope thereof.

I claim:

1. A method of separating the components of a liquid mixture of fats and oils having a nuclei control point $T_n$, which comprises cooling the said mixture from a temperature higher than $T_n$ to the temperature $T_n$, said cooling being carried out in a minimum of about 18 hours and within a temperature decrease of not more than approximately 15° F., cooling the mixture to $T_c$, and separating the crystallized components from the liquid mixture.

2. A method of separating the components of a liquid mixture of fats and oils having a nuclei control point $T_n$ which comprises cooling the said mixture from a temperature higher than $T_n$ to the temperature $T_n$, said cooling being carried out within approximately 18 to 48 hours and within a temperature decrease of not more than approximately 15° F., cooling the mixture to $T_c$, and separating the crystallized components from the liquid mixture.

3. A method of separating the components of a liquid mixture of fats and oils having a nuclei control point $T_n$, which comprises, cooling the said mixture until it reaches $T_n$, said cooling being carried out within approximately a minimum of 18 hours and within a temperature decrease of not more than approximately 15° F., cooling the said mixture from $T_n$ until it reaches the crystallization point $T_c$, heating the mixture from $T_c$ until it reaches $T_r$, and then cooling the mixture until it reaches $T_{rc}$, the aforesaid $T_r$ being below $T_n$, and the aforesaid $T_{rc}$ being above $T_c$ and separating the crystallized components from the liquid mixture.

4. A method of separating the components of a liquid mixture of fats and oils having a nuclear control point $T_n$ which comprises slowly cooling the said mixture until it reaches $T_c$, heating the mixture from $T_c$ to $T_r$, and then cooling the mixture until it reaches $T_{rc}$, the aforesaid $T_r$ being below $T_n$ and the aforesaid $T_{rc}$ being above $T_c$, and separating the crystallized components from the liquid mixture.

5. A method of separating the components of a liquid mixture of fats or oils having a nuclei control point $T_n$ which comprises, cooling the said mixture until it reaches $T_n$, said cooling being carried out within approximately 18 to 48 hours and within a temperature decrease of not more than approximately 15° F., cooling the mixture from $T_n$ at a rate of 5° to 15° F. per 24 hours until it reaches the crystallization point $T_c$, heating the mixture from $T_c$, at a rate of 15° to 45° F. per 24 hours until it reaches $T_r$, and then cooling the mixture at a rate of 5° to 15° F. per 24 hours until it reaches $T_{rc}$, the aforesaid $T_r$ being below $T_n$ and the aforesaid $T_{rc}$ being above $T_c$, and separating the crystallized components from the liquid mixture.

6. A method of separating the components of a liquid mixture of fats and oils having a nuclei control point $T_n$ which comprises, cooling the said mixture from a temperature higher than $T_n$, until it reaches $T_n$, said cooling being carried out within approximately a minimum of 18 hours and within a temperature decrease of not more than approximately 15° F., cooling the mixture from $T_n$ until it reaches the crystallization point $T_c$, heating the mixture from $T_c$ until it reaches $T_r$, and then separating the components of the liquid mixture.

7. A method of separating the components of a liquid mixture of fats and oils which comprises slowly cooling the said mixture until it reaches the crystallization point $T_c$, heating the mixture from $T_c$ until it reaches $T_r$, and separating the components of the liquid mixture.

8. A method of separating the components of a liquid mixture of fats and oils which comprises dissolving said mixture in a solvent to obtain a solution of the mixed fats and oils, cooling the said solution from a temperature higher than its nuclei control point $T_n$, until it reaches $T_n$, then cooling the solution until it reaches the crystallization point $T_c$, heating the solution from $T_c$ until it reaches $T_r$, then cooling from $T_r$ until it reaches $T_{rc}$, and separating the crystallized components from the liquid mixture.

9. A method of separating the components of a liquid mixture of fats and oils in a solvent carrier, which comprises slowly cooling the mixture until it reaches the crystallization point $T_c$, heating the mixture from $T_c$ until it reaches $T_r$, then cooling from $T_r$ until it reaches $T_{rc}$, and separating the crystallized components of the liquid mixture.

10. A method of separating the components of a liquid mixture of fats and oils in a solvent carrier, which comprises slowly cooling the mixture until it reaches the crystallization point $T_c$, heating the mixture until it reaches $T_r$, and separating the crystallized components of the liquid mixture.

11. A method of separating the components of a liquid mixture of fats and oils in a solvent carrier, which comprises slowly cooling the said mixture to the nuclei control point $T_n$ from a higher temperature than $T_n$, cooling the mixture until it reaches the crystallization point $T_c$, heating the mixture from $T_c$ until it reaches $T_r$, and separating the components of the liquid mixture.

12. A method of separating the components of a liquid mixture of fats and oils dissolved in a suitable solvent, said solution having a nuclei control point $T_n$ which comprises cooling the said mixture from a temperature higher than $T_n$ to $T_n$, said cooling being carried out in a minimum of about 18 hours and with a temperature decrease of approximately not more than 15° F., cooling the mixture from $T_n$ until it reaches the crystallization point $T_c$, heating the mixture from $T_c$ until it reaches $T_r$, cooling the mixture until it reaches $T_{rc}$, said $T_{rc}$ being higher than $T_c$ and lower than $T_r$, and separating the crystallized components from the liquid mixture.

CHARLES GREENFIELD.

REFERENCES CITED

The following references are of record in the file of this patent:

UNITED STATES PATENTS

| Number | Name | Date |
| --- | --- | --- |
| 2,205,381 | Eckey et al. | June 25, 1940 |
| 2,425,001 | Parkin et al. | Aug. 5, 1947 |